United States Patent [19]

Conaghan

[11] 4,221,085

[45] Sep. 9, 1980

[54] COVER FOR STORED BULK MATERIAL

[76] Inventor: Bill F. Conaghan, 307 N. 7th, Tonkawa, Okla. 74653

[21] Appl. No.: 941,218

[22] Filed: Sep. 11, 1978

[51] Int. Cl. ............................................. E04D 1/34
[52] U.S. Cl. ......................................... 52/4; 150/52 R
[58] Field of Search ..................... 52/4; 128/339, 340; 223/102–104; 150/52 R

[56] References Cited

U.S. PATENT DOCUMENTS

| 7,494 | 3/1833 | Wingate | 52/4 |
|---|---|---|---|
| 322,045 | 7/1885 | Dean | 52/4 |
| 376,939 | 1/1888 | Bradford | 223/104 |
| 722,105 | 3/1903 | Hervey | 128/339 X |
| 821,862 | 5/1906 | Depew | 52/3 |
| 975,802 | 11/1910 | Shedd | 52/4 X |
| 2,008,251 | 7/1935 | Hillebrand | 223/102 X |
| 2,336,689 | 12/1943 | Karle | 128/339 |
| 2,635,562 | 4/1953 | Abramson | 150/52 R |
| 3,659,641 | 5/1972 | Marino | 150/52 R |
| 3,797,650 | 3/1974 | O'Brien et al. | 150/52 R |

FOREIGN PATENT DOCUMENTS

| 471330 | 10/1914 | France | 128/340 |
| 26874 | 5/1909 | Sweden | 52/3 |
| 313720 | 6/1956 | Switzerland | 52/3 |
| 637,479 | 5/1950 | United Kingdom | 52/4 |

Primary Examiner—Alfred C. Perham

[57] ABSTRACT

A cover for a mound of stored bulk material, such as a round bale, which has an outer surface and ends, has sufficient dimensions to cover more than 50% of the outer diameter of the round bale. The terminus of the cover closest to the ground or storing place contains a tie rope for passing around the bale below its diameter to secure the cover. An added feature is an end flap devised to cover both ends of the round bale. The flap includes provisions for tightening as the stored bulk material shrinks or changes in shape through storage. The flap will also contain a plurality of openings to secure the flap to the bulk material with a tie tool. The cover can be utilized on a mound of hay by the above method and including a tie tool which passes through a portion of hay with a rope threaded through the hay with the tie tool. The rope is secured to a plurality of openings in the cover to further secure the hay cover to the hay.

5 Claims, 7 Drawing Figures

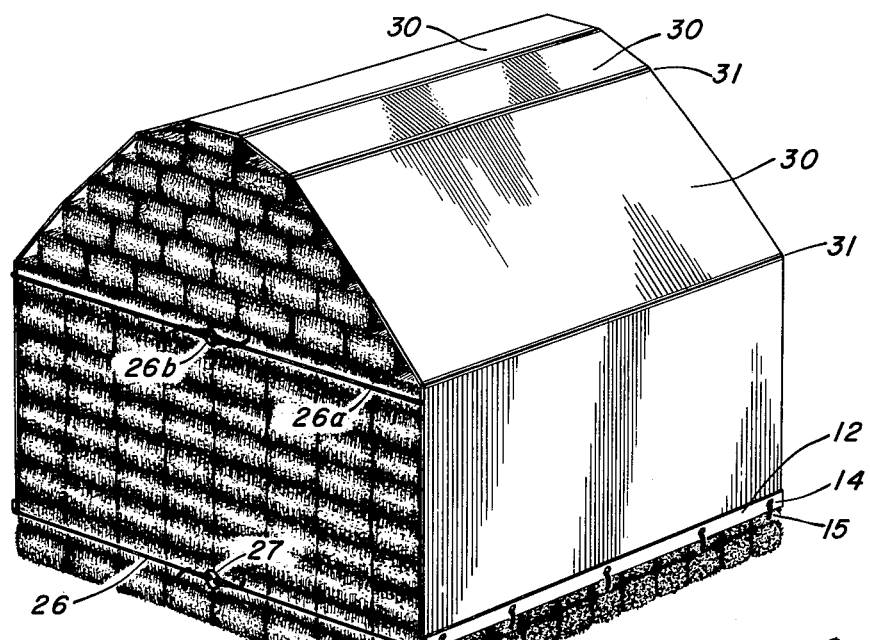
FIG. 3
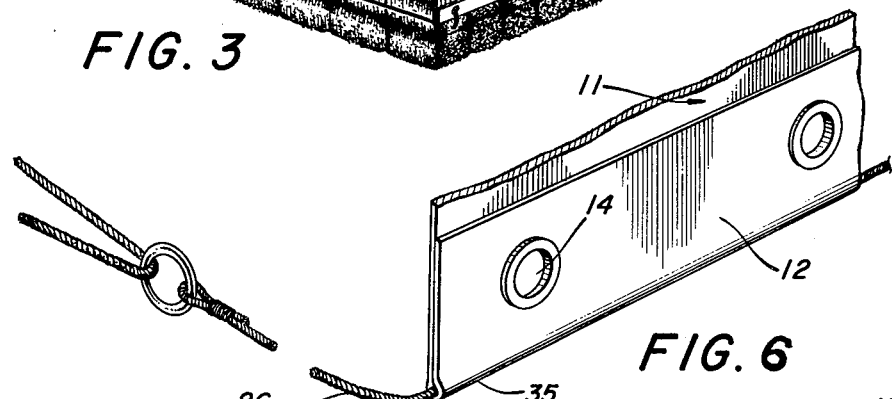
FIG. 6
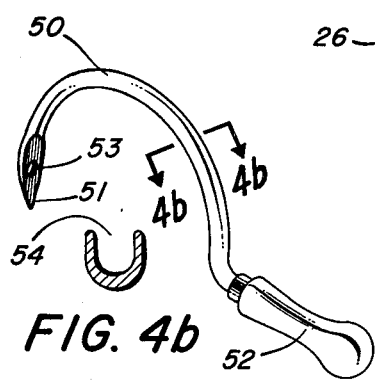
FIG. 4a
FIG. 4b
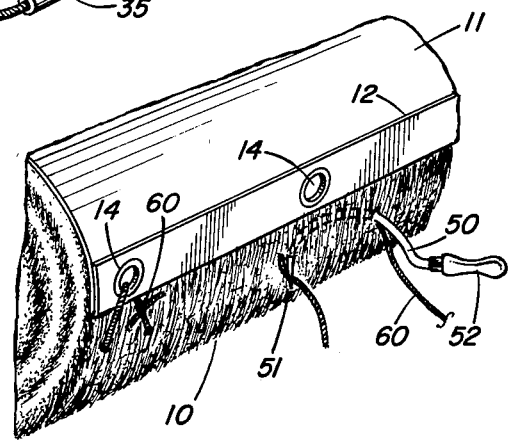
FIG. 5

COVER FOR STORED BULK MATERIAL

BRIEF DESCRIPTION OF THE PRIOR ART

The best prior art known is a U.S. Pat. to Dean-No. 322,045 which provides rigid covers for a haystack. The covers have means for inserting a hook type devise through the side of the cover and into the haystack. A U.S. Pat. to Wingate-No. 7,494 illustrates a tarpaulin having a plurality of ropes attached along the tarpaulin which are anchored to the haystack by means of the aforementioned metal hooks.

BRIEF DESCRIPTION OF THE INVENTION

This invention discloses a cover for bulk material such as haystacks, haybales and the like which is substantially formed of plastic or waterproof cloth. The dimensions of the plastic or waterproof cloth are such that it will cover over 50% of the bulk material being protected, particularly so when the bulk material is a round or cylindrically shaped bale of hay, for example.

Along the terminus of the cover closest to the ground where the hay is normally stored, is a plurality of circular openings. These openings are designed to permit the passage of a special inserting tool which inserts a twine through the opening and into the bulk material and back out of the bulk material. The twine is then disengaged from the inserting tool and tied to the bale or stack cover.

The method of tying provides several advantages. For example, hooks and such metal objects will get lost in the hay so that animals can get injured when the hay is being eaten by them. Furthermore, metal hooks tend to rust and hay may be stored several years in a particular location. If the metal hooks rust and as a consequence become dislodged, the cover will no longer be adequately tied to the bale and it can be easily dislodged by the wind. In addition, the use of metal hooks, as above mentioned, are expensive and therefore restrict the number of bales that can be protected. Twine, on the other hand, is cheap and easily obtainable providing for adequate tie downs for many bales of hay or other bulk material being protected.

The inserting tool is a novel arcuate or semicircular shaped metal tool, having a sharpened point at one end of the arc and an eyelet. Rope is passed through the eyelet and thereby secured to the arcuate shaped metal tool. A handle is provided on the opposite end so that the arcuate shaped metal tool can be forced through the hole or opening in the cover into the bulk material and back out again or the rope can be slipped out of the eyelet, the tool removed and the rope tied to form a secure anchor for the cover at that location.

BRIEF DESCRIPTION OF THE FIGURES

FIG. 3 is a stack of bales having a cover attached thereto;

FIG. 4a is a tie down inserting tool;

FIG. 4b is a cross-section taken through 4b—4b of FIG. 4a;

FIG. 5 illustrates the operation of the inserting tool; and

FIG. 6 shows another modification of the method of securing the cover to a stack of bulk material.

DETAILED DESCRIPTION OF THE INVENTION

Figure 1:
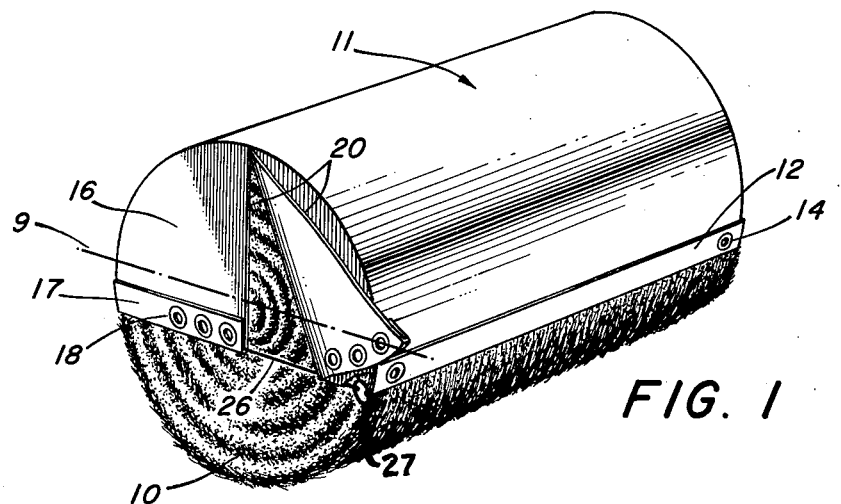
FIG. 1 is a cylindrical bale, having a cover attached thereto with one flap partially open.

Referriing to all the Figures but in particular to FIG. 1-3 and 6, a bulk material 10, which in FIG. 1 is a cylindrical bale of hay usually referred to a round bale of hay, has a cover generally referred to by arrow 11. Cover 11 has a dimension sufficiently wide and sufficiently long to cover all of the width of bale 10 and more than 50% of its exposed circumference, it is important that the terminus of the cover extend below to horizontal diameter 9 of the round bale 10 so that moisture will drop off the cover some distance from the base of the bale in order to prevent rotting of the bottom of the bale.

Referring in particularly to FIG. 1, the terminus 12 of cover 11 has a hem or terminus 12 for securing a rope 26 which extends along terminus 12 and is tied to a ring 27 to secure the cover 11 to the round bale 10. An opening 14 can be utilized in tying the hem or terminus 12 to the hay for additional security if desired.

End flaps 16 may be attached to cover 11 to provide protection for the ends of bulk material 10. The end flaps may have along its terminus 17 a plurality of openings 18 which provide means for tying the terminus 17 to the bulk material or together. A split 20 in flaps 16 provides an adjustment for bale shrinkage, such adjustment will be described in a later portion of the specification.

Figure 2:
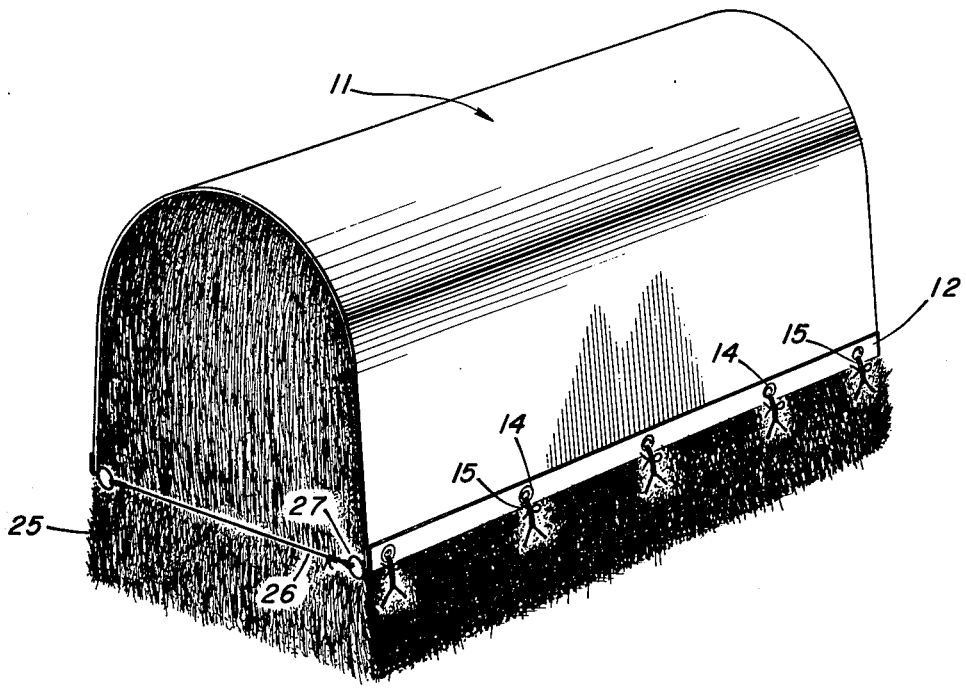
FIG. 2 is a haystack having a cover attached thereto.

Referring to FIG. 2, it is noted that cover 11 can be formed over a large stack of hay 25 in the same manner as for the cylindrical bulk material 10. Likewise, the cover 11 will have a terminus 12 with a plurality of openings 14. These openings 14 will provide for the insertion of a tie twine 15. In addition to the ties 15, a cord, twine, rope or the like 26, can be sewed into the terminus 12 and extended a length sufficient to permit tying at ring 27, thereby further providing security for the cover. A more detailed description of the cord will be afforded to reference to the description of FIG. 7.

Referring to FIG. 3, a stack of bales is illustrated which may be covered in a manner similar to that illustrated in FIG. 2. In FIG. 3, however, rather than the cover being of pliable material such as cloth or plastic, the cover may be made of simi-rigid material such as sheets 30 which are attached at their edge 31 to each other. Along the terminus of the cover 12, as in previous examples, is the plurality of openings 14 which provide ties 15. As in the previous example, a cord 26 may be tied to a ring 27 as shown in FIG. 2. In addition, a second rope 26a and ring 26b may be used to further secure the cover to the large bales of hay. This is particularly true when the area of the bale or the dimensions of the bale are extremely large and may be subjected to high wind stresses.

Referring to FIG. 6 it can be seen that cord 26 is passed through the bottom edge 35 of the terminus 12 of cover 11. Rope 26 can be attached to edge 35 by any usual means such as gluing in the case of plastics, sewing in the case of canvas or any other well known and accepted method. The openings 14 can be formed through terminus 12 by forming metal eyelets, by providing reinforced plastic pieces at that location or other usual means of reinforcing an opening. It should be realized that under high wind stresses the openings could tend to tear. Cord 26 provides additional security against the openings 14 tearing to the point where the cover will be dislodged from the bulk material.

INSERTION TOOL

An insertion tool or thrusting tool is illustrated in FIGS. 4a and 4b. The thrusting tool essentially comprises an arcuate member 50 which has a sharpened point 51 on one end and a handle 52 on the opposite end. An opening 53 is provided, which has a dimension sufficiently large to permit the passage of a tying twine or rope. If desired, the twine can be further contained along the arcuate member 50 by a U-shape gouge or groove 54 being cut in the outer periphery of arcuate member 50. The twine can then pass through opening 53 along the groove 54 to the handle 52 where the twine can be retained by the hand as it is pushed horizontally through and into haybale or bulk material 10. Such a method of operation is illustrated in FIG. 5. Here the arcuate member 50 has its pointed end 51 containing a twine 60 which passes through opening 51 and has sufficient length on both sides of opening 51 so that the twine 60 can be grasped and tied to the cover 11. The hand will grasp handle 52 and the other hand will force against arcuate member 50. The point will be inserted horizontally through and into haybale or bulk material 10 as the point is forced into the bulk material 10 the twine 60 will follow along the groove 54 cut by the arcuate member 50 (see FIG. 5). Once the twine 60 has passed completely through the bulk material 10, then twine 60 is pulled out of opening or eye 51 and the insertion or thrusting tool 52 is removed by moving it backward in the same manner as it was forced into the bulk material 10. The free ends of twine or rope 60 are then tied tightly, by passing them through eyelet 14, securing terminus 12 to the bulk material 10.

During normal storage of any bulk material, such as a cylindrical or round bale illustrated in FIG. 1, the material tends to shrink and collapse with age. When the above occurs, the cover will become loose, providing a space for wind to get under the cover and lift it from the bulk material. In order to keep the cover tight at all times against the bulk material, the plurality of holes 18 along the terminus 17 of flaps 16 provide a means for continuing to tighten the flaps, which will tend to pull the terminus 12 tightly around the bale. In order to accomplish the tightening process, the ties are loosened and the flaps overlapped to an extent where the terminus 12 on opposite sides are again tight. When this occurs ties are shortened through openings 18 thereby providing a means of tightening the cover for the bulk material.

It is obvious that other modifications and changes can be made in the cover, the method of securing it to the bales and the like without departing from the spirit and scope of the invention as set out in the specifications and the appended claims.

What I claim is:

1. Apparatus for covering a cylindrically shaped bale of bulk material stored on the surface of the earth which is positioned with its axis substantially parallel with said surface of the earth comprising a water repellent cover means of sufficient length and width to cover all of the length of said cylindrical bale and more than 50% of its circumference, each terminus of the width of said cover having a plurality of openings therethrough, a twine means inserted into said bale of bulk material below each of said plurality of openings and passing through said openings and tied to secure said cover tightly to said bale whereby water falling on said cover will follow said cover to said terminus and drop onto said surface of said earth away from the portion of said bale of bulk material in contact with said surface of the earth thereby reducing the tendency to rot the bale.

2. An apparatus as described in claim 1 including end flaps, secured along its outer edge to said cover means; and tie means for adjusting the spacing between said terminus as said bulk material shrinks with age.

3. An apparatus as described in claim 2 including means for inserting rope tie means through said tie means and through a portion of said bulk material to retain said flaps secured to said bulk material.

4. An apparatus as described in claim 1, whereas a twine tie means is passed along each of said terminus and extended by an amount to tie across the ends of said bulk material or bale to additionally secure said cover means.

5. In combination with a cover means for a mound of bulk material stored on the surface wherein said cover means has a terminus on opposite sides thereof with a plurality of openings there through spaced along each said terminus, a tie inserter comprising an arcuate shaped member having first and second ends, said first end being pointed and having an eye there through of a size to admit a small cord and a handle on the said second end, whereby said cover means can be placed over a mound of bulk material with each terminus closest to said surface and whereby said arcuate shaped member cen be forced through said bulk material and out again so that said cord can be tied through an opening to the terminus of said cover and pulled tight.

* * * * *